March 27, 1956  C. L. FAIRFAX  2,739,820
PROPELLING ATTACHMENT FOR VEHICLES
Filed Feb. 18, 1953

INVENTOR.
C. L. Fairfax
BY Robb & Robb
Attorneys

United States Patent Office 2,739,820
Patented Mar. 27, 1956

2,739,820

PROPELLING ATTACHMENT FOR VEHICLES

Charles L. Fairfax, Cleveland, Ohio

Application February 18, 1953, Serial No. 337,555

9 Claims. (Cl. 280—12.11)

My present invention comprises a novel propelling attachment for vehicles, designed for detachable mounting upon a child's sled or like vehicle whereby to enable the child to propel the sled by bodily movement while seated thereon.

Various devices for effecting propulsion of children's vehicles in a somewhat similar manner, have been heretofore proposed. Such prior devices, however, have been comparatively complicated in construction and have been built into the vehicle so that they are not adapted for detachable association with such vehicles which are not originally constructed incorporating such devices.

One of the principal objects of my invention is to provide such a propelling device in the form of an attachment which may be readily detachably associated with vehicles not initially provided therewith.

Another principal object of my invention is to provide such a propelling attachment which is of relatively simple construction and which may be quickly and readily mounted upon the child's vehicle without in any way altering the construction of the latter.

Another object of my invention is to provide such a propelling attachment which is universally adaptable for association of the same with vehicles of a certain type having different transverse dimensions.

A further object of my invention is to provide such a propelling attachment having pointed traction surface engaging blades which are retractable when out of use so as to eliminate the possibility of causing injury from contact with the pointed blade.

In carrying my invention into practice, I provide a propelling attachment for vehicles, comprising a seat member having associated therewith rotatable supporting means for rollingly supporting the seat member upon the vehicle, and I provide traction surface engaging members including arms pivotally connected to the seat member at each side thereof, and extending downwardly therefrom, said arms being provided at their free ends with elements for tractionally engaging the traction surface when the seat member is rollingly supported upon the vehicle. I further provide abutment means engageable with the arms when the same are in vertical position, and spring means biasing said arms for engagement with said abutment means.

The propelling attachment of my invention is designed for movement longitudinally of the vehicle in the direction of travel, and I provide the attachment with aligning rollers adapted to have rolling engagement with the sides of the vehicle for maintaining the longitudinal alignment of the attachment therewith; and I provide means for adjusting the aligning rollers to different fixed positions transversely of the seat member for enabling the attachment to be accommodated to vehicles of differenet transverse dimensions. I also provide means for adjusting the arms to different fixed positions transversely of the seat member.

In accordance with my invention also, I provide traction surface engaging elements in the form of blades having points to dig into said surface, said blades being pivotally associated with said arms for movement to operative position, and to a retracted position enclosed within the said arms.

For a detailed description of the invention, reference is made to the accompanying drawing, in which.

Figures 1, 4:
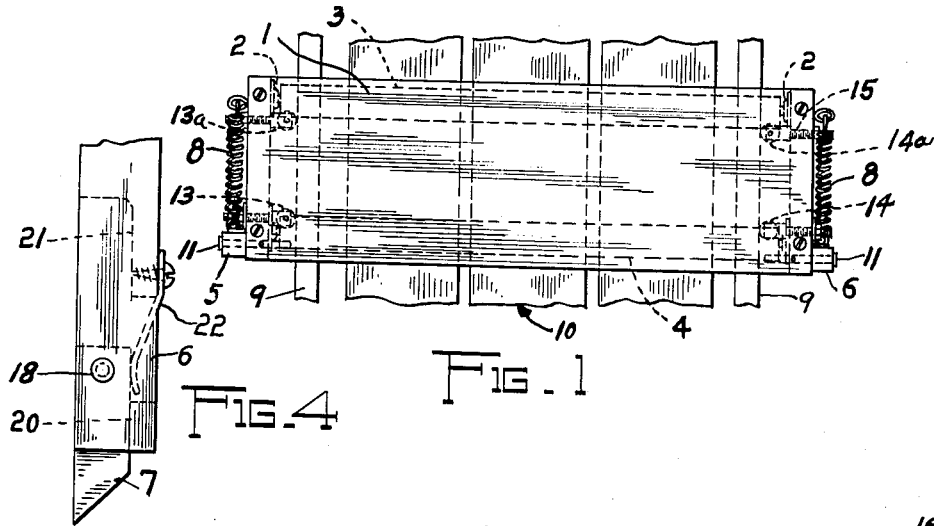
Figure 1 is a top plan view showing the propelling attachment of the invention, mounted in operative position, upon a child's coaster sled, parts of the latter being broken away.
Figure 4 is a detailed view of one of the arms of the propelling attachment, the view being on an enlarged scale and showing the lower portion of the arm with its pivoted blade element.

Now referring to the drawing and describing the invention in detail, the propelling attachment of the invention comprises the flat seat member designated 1, having the side members 1a and 1b suitably secured to the under side thereof. Upon the inner faces of these side members 1a and 1b, are suitably mounted bearing brackets 2 which rotatably receive the shaft or trunnion ends of the roller members 3 and 4 for rollingly supporting the seat member upon the upper surface of a child's vehicle. In the drawing, the propelling attachment including the seat member 1 is shown in operative position rollingly mounted upon the upper surface of a child's coaster sled designated 10, the roller members 3 and 4 rollingly engaging the upper surface of the side rails 9 of said sled. The roller members 3 and 4 are spaced from one another longitudinally of the direction of travel of the attachment upon the vehicle, the same as the direction of travel of the vehicle, the roller members 3 and 4 having their axes extending transversely of the attachment between the side members 1a and 1b thereof.

The attachment includes a pair of arms 5 and 6, one at each side of the attachment, and pivotally connected to the seat member 1 by means of pivot shafts or bolts 11, the inner ends of which are received in suitable passages or sockets provided in the seat member 1, the arms 5 and 6 extending downwardly from the seat member 1 and normally maintained in vertical position as shown in the drawing. Each of the arms 5 and 6 is provided with a respective traction surface engaging element 7 in the form of a blade having a pointed traction surface engaging end, and pivoted to its respective arm adjacent the lower end thereof. A respective spring member 8 is provided for each of the arms 5 and 6, one end of the respective spring being connected to the respective arm intermediate the end of the latter, and the other end of said spring being connected to the adjacent side of the attachment at a point spaced from the pivot 11, whereby to yieldably urge the arms in a forward direction having reference to the direction of travel of the vehicle upon which the attachment is mounted. Abutment means in the form of angle plates 12 are suitably secured to the outer faces of the side members 1a and 1b, the plates 12 having the laterally offstanding flanges 12a engageable with the arms 5 and 6 when the latter are in vertical position as shown in the drawing. It will be seen that the springs 8 bias the arms 5 and 6 for engagement with the abutment means so that said arms are normally maintained in vertical position as shown.

For maintaining longitudinal alignment of the propelling attachment with respect to the vehicle on which it is mounted, a pair of aligning rollers 13 and 13a is provided, same carried by the side member 1a and the rollers positioned to extend inwardly from the inner face of said side member for engagement with the adjacent outer side portion of the vehicle upon which the attachment is mounted. A similar pair of rollers 14 and 14a is provided, carried by the opposite side member 1b. The rollers 13, 13a, and 14, 14a of each pair are spaced longitudinally of the attachment in the direction of travel thereof when operatively mounted upon a vehicle as shown. In the drawing, said rollers are shown in engagement with the outer faces of the side rails 9 of the sled 10 for maintaining alignment of the attachment with respect to the sled.

Said rollers 13, 13a, 14, 14a may be pivotally carried by suitable bifurcated blocks, as shown, having threaded studs 15 received in correspondingly threaded bushings extending through the side members 1a and 1b, and for convenience of mounting, the abutment plates 12 may be apertured and the studs 15 extended therethrough with the nuts 16 provided for each stud serving to secure both said rollers and said angle plates in position upon the side members 1a and 1b.

Preferably means is provided for adjustment of the positions of the rollers 13 and 13a and 14 and 14a transversely of the attachment, and this is expediently accomplished by making the threaded studs 15 of sufficient length so that they can be rotatably adjusted with respect to their threaded bushings and secured in the desired fixed positions by tightening the nuts 16. Thus, the rollers 13—13a and 14—14a may be suitably adjusted for engagement with the opposite sides of the vehicle upon which the attachment is mounted for the accommodation of vehicles of different transverse dimensions.

Provision is also made for transverse adjustment of the arms 5 and 6, by making the pivot bolts 11 and their corresponding sockets of sufficient length so that the pivot bolts 11 may be moved outwardly or inwardly, relative their sockets, the desired distance and fixed in the desired transverse position by means of the set screws 17 provided for cooperation with pivot bolts 11.

Figures 2, 3:
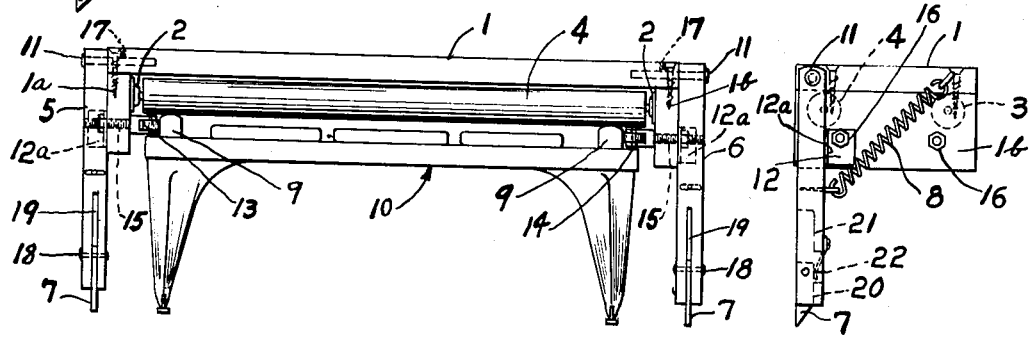
Figure 2 is an end elevation, showing the propelling attachment of the invention mounted upon a child's sled.
Figure 3 is a side elevation of the propelling attachment alone.

As previously mentioned, the traction surface engaging blades 7 are pivotally mounted at the lower ends of the arms 5 and 6 by means of pivot pins 18, said blades being received within hollow slot-like portions 19 provided in said arms. Interiorly of the slot-like portions 19, said arms are provided with abutment portions 20 for engaging the blades 7 when pivotally moved to extended operative position as shown in the full lines in the drawing for limiting the pivotal movement in that direction, and said arms are also provided interiorly of the slot-like portions with abutment portions 21 for engaging the blades 7 when pivotally moved in an opposite direction to retracted position enclosed within the arms 5 or 6 as shown by dotted line in Figure 3. A spring leaf or finger 22 is provided, engageable with the blade 7 for maintaining the same in either the extended operative position, or the retracted enclosed position. When the attachment is not in use, the blades may be moved to retracted position so as to avoid injury to children handling the same.

Figure 5:
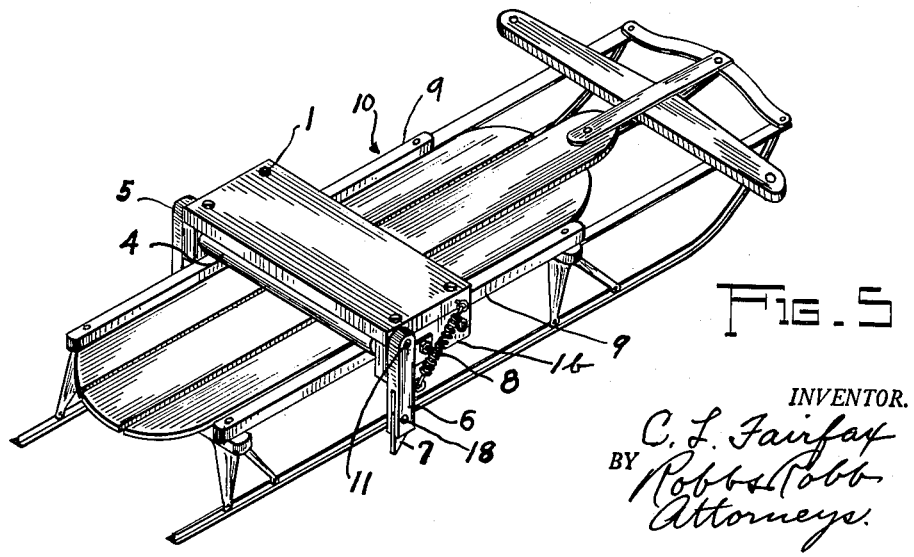
Figure 5 is a perspective view showing the propelling attachment of the invention mounted in operative position on a child's sled.

In use, the propelling attachment of the invention may be readily detachably mounted upon a child's vehicle, as above described and shown in the drawing, the arms 5 and 6 and roller members 13—13a and 14—14a being suitably adjusted for accommodation of the transverse dimensions of the particular vehicle, the blades 7 being adjusted to extended operative position as shown in full line. With the attachment thus rollingly mounted upon the upper surface of the vehicle, a child may sit upon the seat 1 and place his feet upon the steering bar of the sled in the usual manner. Assuming that the attachment is in the condition of Figure 5 with the points of the blades 7 engaging the traction surface, the child sitting upon the seat 1 may cause the same to move forwardly of the sled under which conditions the springs 8 will yield to permit the arms 5 and 6 to pivot rearwardly respecting the direction of travel. When the child has thus moved the attachment forwardly on the sled, he may then push with his feet against the steering bar of the sled and thus cause the latter to move forwardly relative the seat 1, the latter being maintained in fixed position with respect to the traction surface by digging engagement of the pointed ends of the blades 7 therewith, the arms 5 and 6 being maintained under these conditions in vertical position by engagement with the abutment members 12. Thus, by alternate movement of the attachment forwardly of the sled and subsequent movement of the sled forwardly of the attachment, the child will be enabled to propel the sled forwardly while sitting upon the seat member 1.

I claim:

1. In combination, a vehicle comprising spaced traction members upon which the vehicle is carried for forward propulsion, and a propelling unit mounted on said vehicle and comprising a seat spanning the top portion of the vehicle from side to side thereof, a plurality of horizontal rollers connected with the seat and disposed intermediate the latter and the top surface of the vehicle so as to roll forwardly and rearwardly upon said top surface, said supporting rollers extending substantially entirely across the top portion of the vehicle transversely thereof, side members attached to opposite ends of the said seat and depending from the latter at opposite sides of the vehicle, bearings on the inner sides of said side members for the ends of said supporting rollers, and propelling members carried by said side members at opposite sides of the vehicle and movable into engagement with the surface over which the vehicle travels during rearward movement of the seat when rolling rearwardly on the top of the vehicle, said propelling members being movable for inoperative engagement with the said surface when the seat is rollingly moved on the vehicle in a forward direction.

2. The combination structure claimed in claim 1 combined with a plurality of rollers mounted at the inner sides of the said side members and operating in rolling contacts with vertical side portions of the vehicle, as the seat is rollingly moved backwardly and forwardly on the top portion of said vehicle.

3. A propelling attachment for vehicles, comprising a seat member adapted to transversely span a vehicle, rotatable supporting means beneath said seat member for shiftably supporting said seat for longitudinal shifting movements upon a horizontally extended portion of the vehicle, an arm pivotally connected at the respective opposite sides of said seat and having an end adapted to project into engagement with the traction surface on which the vehicle is disposed, and cooperative means on said seat and on the respective arms for maintaining the arms in a traction surface engaging position while allowing pivotal movement of said arms to an inoperative position upon relative longitudinal movement of said seat with respect to the vehicle in one direction.

4. A propelling attachment as defined in claim 3, wherein said seat is provided at its respective opposite sides with bearing means disposed on an axis normal to the axis of the rotatable supporting means aforesaid and adapted to engage the respective opposite sides of the vehicle.

5. A propelling attachment as defined in claim 3, wherein said arms are each provided at their traction surface engaging end with a traction surface engaging blade, means pivotally mounting said blades on said arms, and cooperative means on said blades and said arms for retaining each blade in an operative position.

6. A propelling attachment as defined in claim 3, wherein said rotatable supporting means comprises a pair of axially spaced rollers, said seat having depending roller supports at its opposite sides, and said rollers being journaled in said roller supports.

7. In combination, a vehicle having a horizontally and longitudinally extended portion and means for supporting the vehicle for movement, and a propelling unit removably mounted on said vehicle, said propelling unit including a seat overlying said horizontal portion and transversely spanning said vehicle, rollers carried by said seat and rollingly engaged with the horizontal portion of the vehicle, and a pair of arms respectively disposed at the opposite sides of said seat and pivotally mounted on said seat, said arms being adapted to project into engagement with the surface on which the vehicle is disposed, means for limiting pivotal movement of said arms in one direction to an operative position where they are in engagement with the vehicle supporting surface, said arms being pivotal in one direction to an inoperative position to permit longitudinal movement of said seat on said vehicle, and means for normally maintaining said arms in an operative position as aforesaid.

8. The combination as defined in claim 7, wherein said seat is provided with depending side members, said side members each having a rotatable bearing element mounted thereon, and said bearing elements engaging the respective opposite sides of said vehicle.

9. The combination as defined in claim 7, wherein the side members have means adjustably mounting said bearing elements for shifting movements towards and away from said side members.

References Cited in the file of this patent

UNITED STATES PATENTS

| | | |
|---|---|---|
| 374,428 | Robbin | Dec. 6, 1887 |
| 838,724 | Lang | Dec. 18, 1906 |
| 1,702,091 | Sellner | Feb. 12, 1929 |
| 2,270,242 | Anderson | Jan. 20, 1942 |

FOREIGN PATENTS

| | | |
|---|---|---|
| 178,541 | Germany | Nov. 15, 1906 |
| 253,157 | Switzerland | Nov. 1, 1948 |